(12) United States Patent
Vasters et al.

(10) Patent No.: US 8,903,884 B2
(45) Date of Patent: Dec. 2, 2014

(54) MULTI-TENANT SERVICES GATEWAY

(75) Inventors: Clemens Vasters, Kirkland, WA (US);
Ronen Hilewicz, Seattle, WA (US);
David Wortendyke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 448 days.

(21) Appl. No.: 13/031,263

(22) Filed: Feb. 21, 2011

(65) Prior Publication Data
US 2012/0215918 A1 Aug. 23, 2012

(51) Int. Cl.
*G06F 15/16* (2006.01)
*G06F 9/50* (2006.01)
*H04L 29/08* (2006.01)

(52) U.S. Cl.
CPC .............. *G06F 9/5011* (2013.01); *H04L 67/02* (2013.01)
USPC ........... 709/201; 709/202; 709/217; 709/223; 709/230

(58) Field of Classification Search
USPC ......... 709/230, 236, 246, 201, 202, 213, 217, 709/223
See application file for complete search history.

(56) References Cited

U.S. PATENT DOCUMENTS

| | | | |
|---|---|---|---|
| 6,629,127 B1 * | 9/2003 | Deen et al. ..................... | 709/203 |
| 6,826,626 B1 * | 11/2004 | McManus ..................... | 709/246 |
| 6,895,433 B1 * | 5/2005 | Slater et al. ................... | 709/220 |
| 7,240,100 B1 * | 7/2007 | Wein et al. ..................... | 709/214 |
| 7,266,827 B1 * | 9/2007 | Sievert .......................... | 719/330 |
| 7,657,591 B2 * | 2/2010 | Vishwanath et al. .......... | 709/201 |
| 7,676,562 B2 * | 3/2010 | Reistad et al. ................ | 709/223 |
| 8,321,921 B1 * | 11/2012 | Ahmed et al. ................... | 726/7 |
| 2002/0133610 A1 * | 9/2002 | Hadland ........................ | 709/230 |
| 2003/0009519 A1 * | 1/2003 | Gosling et al. ................ | 709/203 |
| 2004/0030788 A1 * | 2/2004 | Cimo et al. .................... | 709/229 |
| 2004/0179035 A1 * | 9/2004 | Ullmann et al. ............... | 345/745 |
| 2004/0236674 A1 * | 11/2004 | Chen et al. ........................ | 705/38 |
| 2005/0076336 A1 * | 4/2005 | Cutrell et al. ................. | 718/100 |
| 2005/0163136 A1 | 7/2005 | Chiu et al. | |
| 2005/0182843 A1 * | 8/2005 | Reistad et al. ................ | 709/230 |
| 2005/0246717 A1 * | 11/2005 | Poole et al. ................... | 719/316 |
| 2006/0075042 A1 * | 4/2006 | Wang et al. .................... | 709/206 |
| 2006/0085421 A1 * | 4/2006 | Backhouse et al. ............. | 707/10 |
| 2006/0235715 A1 * | 10/2006 | Abrams et al. ..................... | 705/1 |
| 2007/0050707 A1 * | 3/2007 | Liu et al. ....................... | 715/513 |
| 2007/0150480 A1 | 6/2007 | Hwang et al. | |
| 2008/0144655 A1 * | 6/2008 | Beam et al. .................... | 370/466 |

(Continued)

OTHER PUBLICATIONS

Shafiq et al.; AgentWeb Gateway—a middleware for dynamic integration of Multi Agent SYstem and Web Services Framework; 2005.*

"International Search Report", Mailed Date: Sep. 12, 2012, Application No. PCT/US2012/025792, Filed Date : Feb. 20, 2012, pp. 9.

(Continued)

*Primary Examiner* — Jimmy H Tran
(74) *Attorney, Agent, or Firm* — Ben Tabor; Kate Drakos; Micky Minhas

(57) ABSTRACT

A system and method for providing services to multiple tenants. A system provides a gateway that acts as an intermediary between the tenants and multiple subsystems that provide resources. A management gateway handles requests to manage resources. A runtime gateway handles requests to perform operations related to the resources. A set of protocol handlers isolates the subsystems from protocols used by the tenants. A pipeline of components provides processing, such as authorization, of requests from tenants. Identification of resources is performed using a mechanism that enables multiple namespaces, which may be designated by tenants.

20 Claims, 7 Drawing Sheets

(56) References Cited

U.S. PATENT DOCUMENTS

| | | | |
|---|---|---|---|
| 2008/0208979 A1* | 8/2008 | Vishwanath et al. | 709/206 |
| 2008/0256607 A1* | 10/2008 | Janedittakarn et al. | 726/4 |
| 2009/0156213 A1 | 6/2009 | Spinelli et al. | |
| 2009/0276490 A1 | 11/2009 | Koning et al. | |
| 2010/0077449 A1* | 3/2010 | Kwok et al. | 726/3 |
| 2010/0094847 A1* | 4/2010 | Malan et al. | 707/705 |
| 2010/0306765 A1 | 12/2010 | DeHaan | |
| 2010/0325219 A1 | 12/2010 | Vasters et al. | |
| 2011/0125895 A1* | 5/2011 | Anderson et al. | 709/224 |
| 2011/0126047 A1* | 5/2011 | Anderson et al. | 714/15 |
| 2011/0289140 A1* | 11/2011 | Pletter et al. | 709/203 |
| 2012/0047239 A1* | 2/2012 | Donahue et al. | 709/220 |
| 2012/0179646 A1* | 7/2012 | Hinton et al. | 707/607 |

OTHER PUBLICATIONS

"Enhanced Secure Multi-Tenancy Design Guide", Retrieved at << http://www.cisco.com/en/US/docs/solutions/Enterprise/Data_Center/Virtualization/securecldg_V2.html >>, Retrieved Date : Nov. 23, 2010, pp. 63.

Chong, et al., "Architecture Strategies for Catching the Long Tail", Retrieved at << http://msdn.microsoft.com/en-us/library/aa479069.aspx >>, Apr. 2006, pp. 21.

"Hosting a Multi-Tenant Application on Windows Azure", Retrieved at << http://msdn.microsoft.com/en-us/library/ff966480.aspx >>, Nov. 23, 2010, pp. 9.

"Private Cloud Computing for Enterprises: Meet the Demands of High Utilization and Rapid Change", Retrieved at << http://www.cisco.com/en/US/solutions/collateral/ns340/ns517/ns224/ns836/ns976/white_paper_c11-543729.pdf >>, 2009, pp. 13.

* cited by examiner

# MULTI-TENANT SERVICES GATEWAY

BACKGROUND

Computing systems are moving toward an architecture known as cloud computing. In cloud computing, servers that are remotely located provide resources in response to requests from clients or other servers. Resources may include data storage, processor usage, communications subsystems, queuing services, or various other computing services. Generally, in cloud computing, the physical location of servers is isolated from requesters.

Numerous protocols may be used when communicating across a network. A client device may communicate with multiple services, and may employ multiple communication protocols, each protocol corresponding to a service with which the client communicates. Conversely, a service may employ multiple protocols in order to accommodate clients communicating with different protocols. In some environments, changing services may involve changing a protocol that a client employs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, in one embodiment, a system, method, and components operate to provide a gateway to a multiple services for multiple tenants. A gateway acts as a front end for the various services.

In one embodiment, mechanisms include receiving resource management requests, such as requests to allocate a resource, from tenants. In response, the system may determine, based on the specified resource type, a corresponding subsystem, forward the request to the determined subsystem, receive from the subsystem an identification of the resource, store resource data descriptive of the resource, including an identification of the resource, and send to the tenant the identification of the resource.

In one aspect of the mechanisms described herein, mechanisms may include receiving, from the tenant in a first protocol, a runtime request to perform an operation related to a resource, retrieve resource data, attach the resource data to the request, and forward the request in a second protocol to the corresponding subsystem. In some configurations, multiple protocol heads may be included, each one implementing a corresponding protocol for communicating with tenants, extracting data from incoming requests, attaching resource data, and forwarding the data in a canonical form to a subsystem. The protocol handlers may isolate the subsystems from the protocols used by the tenants. This may enable subsystems to be added to the system without being configured to process the protocols of the tenants. It may also enable new protocols to be handled by adding new protocol handlers, without reconfiguring the subsystems.

In one embodiment, a system may include one or more pipeline components that selectively process incoming requests, based on resource data or other configuration data. One configuration includes a pre-authorization component that authorizes incoming requests prior to forwarding them to subsystems. In one embodiment, an access control service selectively provides an access token based on a security token. The pre-authorization component may process the access token to determine authorization. A subsystem may be configured to subsequently perform additional authorization.

In one embodiment, the system may provide, to a tenant, a management URI for requesting management operations related to a resource and a runtime URI for requesting runtime operations related to the resource. In one implementation, the URI specifies a namespace and a component identifier. The URI may include a string for private use by the corresponding subsystem.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
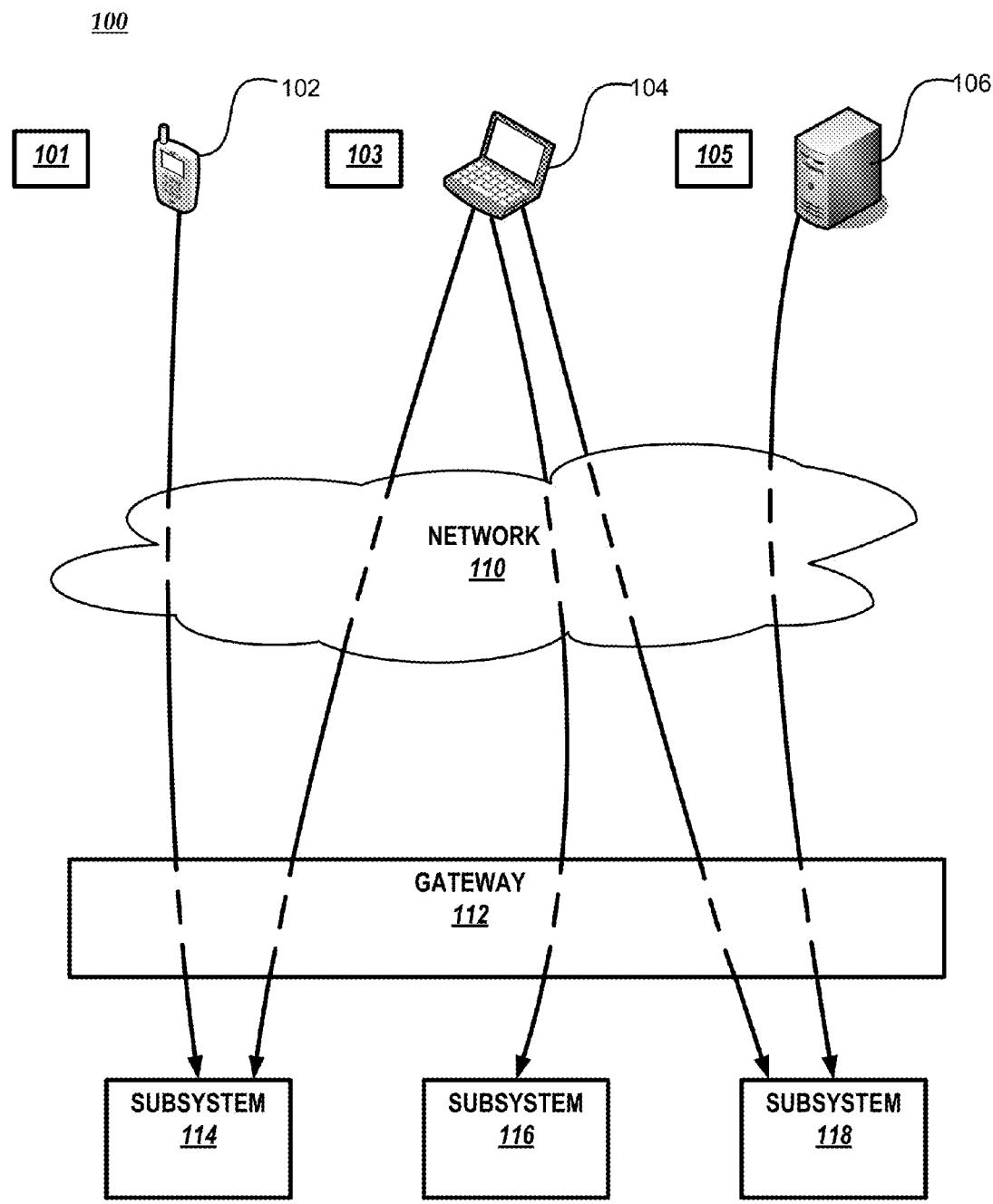
FIG. 1 is a block diagram of an example environment in which mechanisms described herein may be deployed.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "processor" refers to a physical component such as an integrated circuit that may include integrated logic to perform actions.

As used herein, the term "application" refers to a computer program or a portion thereof, and may include associated data. An application may be an independent program, or it may be designed to provide one or more features to another application. An "add-in" and a "plug-in" are examples of applications that interact with and provides features to a "host" application.

An application is made up of any combination of application components, which may include program instructions, data, text, object code, images or other media, security certificates, scripts, or other software components that may be installed on a computing device to enable the device to perform desired functions. Application components may exist in the form of files, libraries, pages, binary blocks, or streams of data. An application component may be implemented as a combination of physical circuitry and associated logic. For example, an ASIC may be used to implement an application component.

As used herein, the term "authenticate" refers to confirming that facts or claims are true, to an acceptable degree of certainty. Authenticating a user or a user's identity applies to confirming that the stated identity of the user is sufficient and accurate. Authenticating a request from a user may include confirming that the identity information included with the request is accurate, that the request originated with or is authorized by the identified user, that the request has not been improperly modified, or that other information in the request is accurate. Authentication has an associated degree of certainty, allowing for a situation in which information has been authenticated yet may be inaccurate.

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on non-transitory computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

FIG. 1 is a block diagram of an environment 100 in which embodiments may be practiced. FIG. 1 provides a basic understanding of an example environment, though many configurations may be employed and many details are not illustrated in FIG. 1. As illustrated in FIG. 1, an example environment 100 includes one or more clients 102, 104, or 106. In FIG. 1, each client is illustrated as a computing device. For example, client 102 is a hand-held computing device, client 102 is a laptop or other portable computing device, and client 106 may be a desktop computer, server, or other relatively stationary computing device. In various environments, clients may be in the form of any one or more computing devices, computer processes, modules, or similar component.

In the example environment, tenants 101, 103, and 105 employ clients 102, 104, and 106 respectively to communicate with the system. A tenant may be a person, a user account, a computing process, or other such entity that performs computing operations. Though each tenant is illustrated corresponding to one client device, a tenant may employ multiple client devices concurrently or sequentially. For example, a tenant may log in to any client device to perform computing operations. Similarly, a tenant process may execute on one or more client devices. For ease of discussion, each tenant is discussed as having one unique client computing device, though the invention is not so limited. In one configuration, a tenant may itself be a system or cloud service that provides services to other clients.

As illustrated in FIG. 1, in example environment 100, each of clients 102, 104, or 106 communicates with one or more subsystems 114, 116, or 118. Multiple tenants may communicate with a common subsystem. Thus, there may be a many-to-many relationship between clients and subsystems. In the example illustrated configuration, client 102 communicates with subsystem 114, client 104 communicates with subsystem 116 and 118, and client 106 communicates with subsystem 118. Numerous other configurations may also exist, and configurations may change at various times.

Each of subsystems 114-118 may provide a corresponding set of services to requesting tenants. Services may be referred to as resources. Examples of resources include data storage and retrieval, computing processor time, queuing, messaging, or connectivity.

Each tenant may have a corresponding subscription to a set of services that it employs. In various embodiments, a subscription may be accounted for in a variety of ways. For example, a credit card model may charge a tenant for each service that the tenant uses, or the amount of a service that it uses. In another example, a lump sum subscription may charge a tenant on a periodic basis for services used up to a specified limit, or on an unlimited basis. Various other accounting mechanisms or combinations thereof may be used to implement subscriptions.

In one embodiment, each tenant is provided with corresponding resources in a way that is isolated from other tenants' resources. For example, multiple tenants may each have a corresponding data storage resource that is only visible to the owning tenant. From the point of view of a tenant, it may appear as though it is the only tenant using the system, though the system is aware of multiple tenants Resources may be virtually separated, though they are not necessarily physically separated. In some embodiments, a resource provided to a tenant may be physically distributed across multiple processors, storage devices, or computing devices, though presented to a tenant as a virtually integrated resource. Over a period of time, a resource may be physically moved, though the location is transparent to the owning tenant.

As further illustrated, communications between each of clients 102, 104, or 106 and subsystems 114, 116, or 118 may pass through gateway 112. Thus gateway 112 functions as an intermediary between each of clients 102, 104, or 106 and subsystems 114-118. Briefly, gateway 112 may process communications by canonicalization of communications between clients and subsystems in order to provide a unified way of processing multiple computer protocols or formats. Gateway 112 may provide various preprocessing services, such as authentication or authorization of tenants, logging, filtering, tracing, transformations, or other services. Mechanisms of gateway 112 are discussed in further detail herein.

As illustrated, each of clients 102, 104, or 106 may communicate with any of subsystems 114-118 through network 110. Network 110 may include a local area network, a wide area network, direct connections, or a combination thereof. In one embodiment, network 110 includes the Internet, which is a network of networks. Network 110 may include wired communication mechanisms, wireless communication mechanisms, or a combination thereof. Communications between clients 102, 104, or 106, and gateway 112 or subsystems 114-118 or other computing devices may employ one or more of various wired or wireless communication protocols, such as IP, TCP/IP, UDP, HTTP, SSL, TLS, FTP, SMTP, WAP, Bluetooth, or WLAN.

Figure 7:
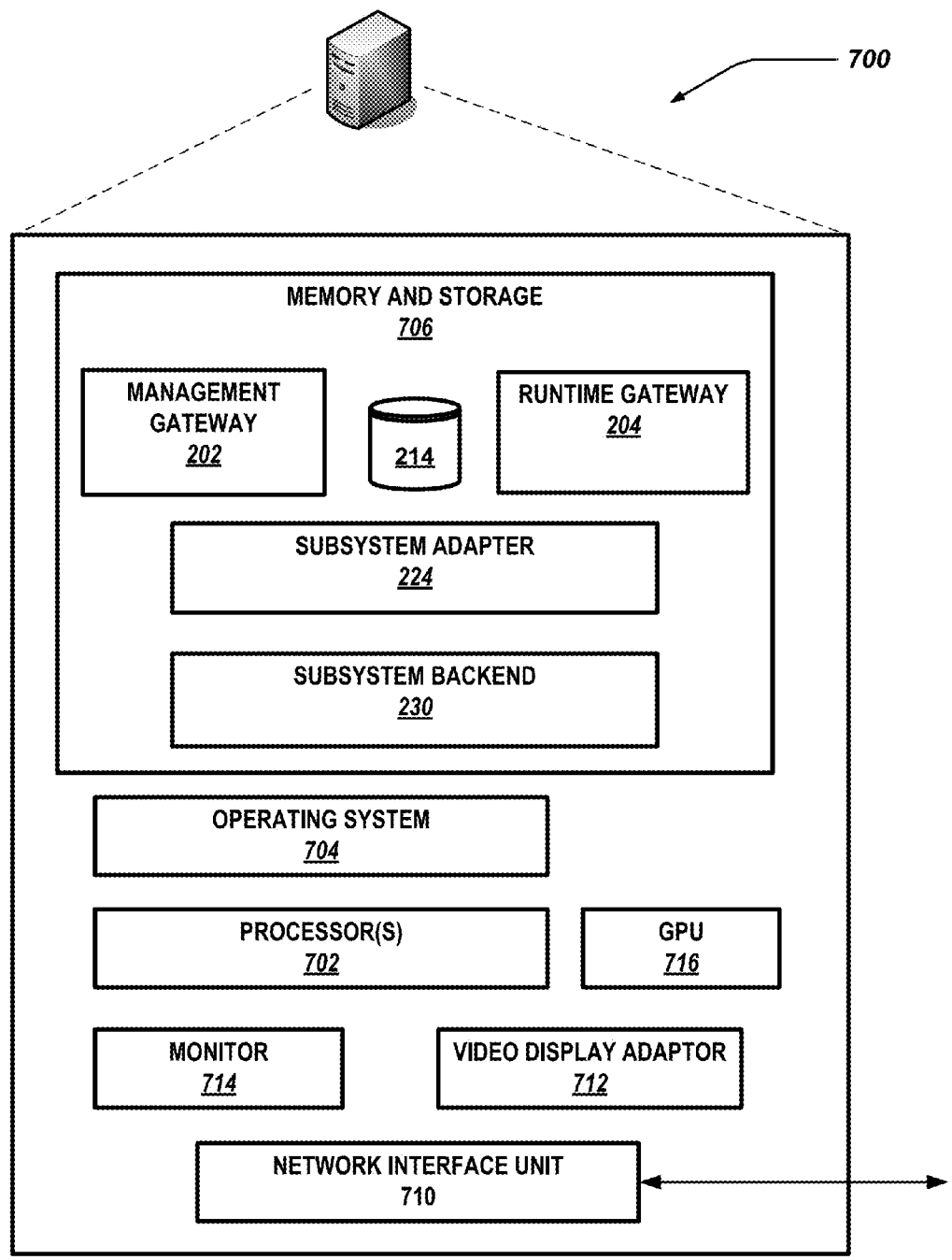
FIG. 7 is a block diagram showing one embodiment of a computing device, illustrating selected components of a computing device that may be used to perform functions described herein.

In one embodiment, each of clients 102, 104, and 106, gateway 112, and subsystems 114, 116, and 118 is implemented by one or more computing devices. A computing device may be a special purpose or general purpose computing device. In brief, one embodiment of a computing device that may be employed includes one or more processing units, a memory, a display, keyboard and pointing device, and a communications interface. The one or more processing units may include one or more multiple core processors. Example computing devices include mainframes, servers, blade servers, personal computers, portable computers, communication devices, consumer electronics, or the like. A computing device may include a general or special purpose operating system. The Windows® family of operating systems, by Microsoft Corporation, of Redmond, Wash., are examples of operating systems that may execute on a computing device. FIG. 7 illustrates an example embodiment of a computing device that may be used to implement gateway 112, subsystems 114-118, or clients 102, 104, or 106.

Figure 2:
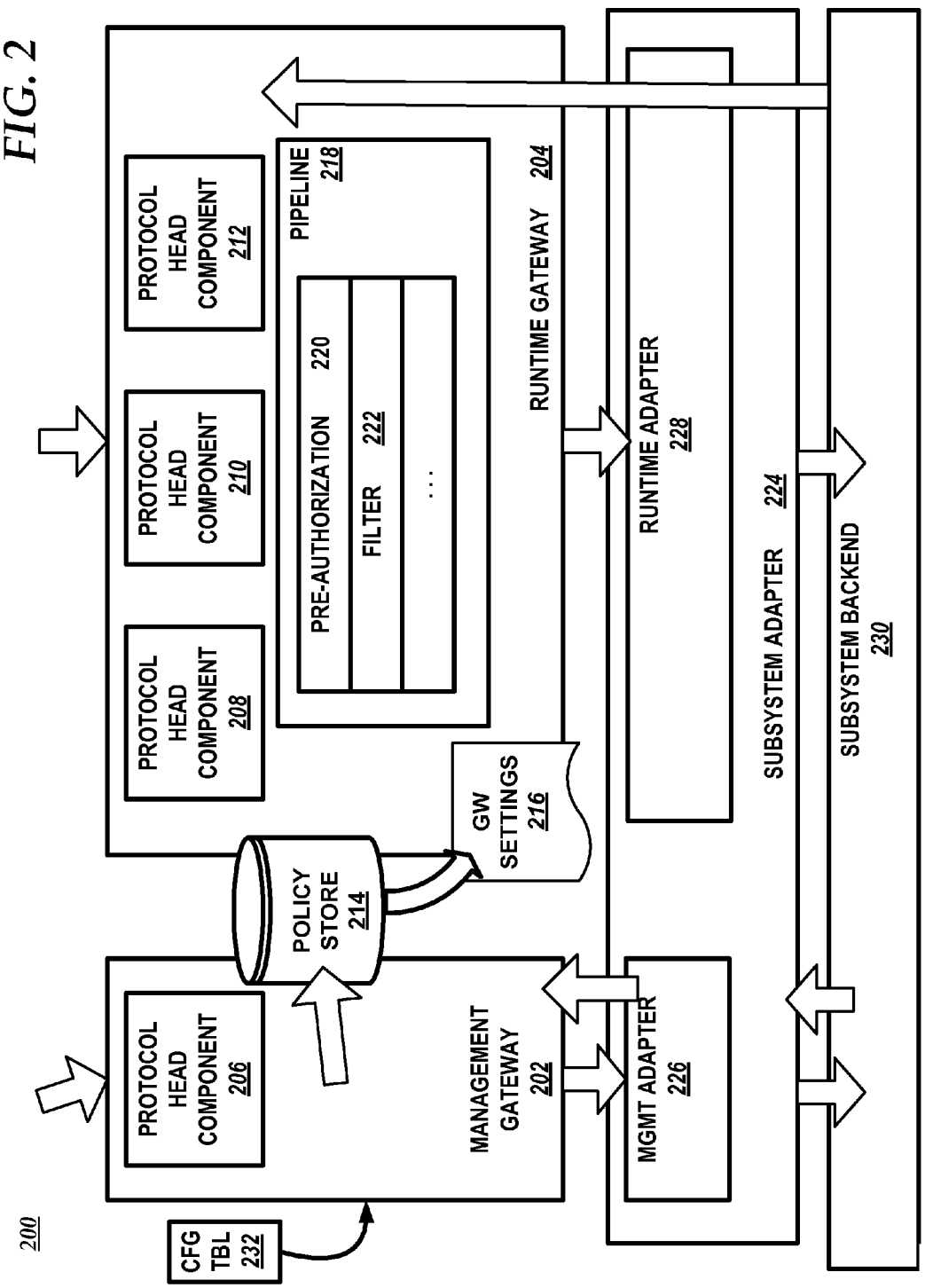
FIG. 2 is a block diagram of an example gateway system in which mechanisms described herein may be deployed.

FIG. 2 is a block diagram of an example system 200 in which mechanisms described herein may be deployed. The illustrated example system 200 may be used in environment 100 of FIG. 1 or a variation thereof. Example system 200 includes management gateway 202 and runtime gateway 204, which may be components of gateway 112. Example system 200 further includes subsystem adapter 224 and subsystem backend 230, which may be components of subsystem 114, 116, or 118.

As illustrated, management gateway 202 includes protocol head 206; runtime gateway 204 includes protocol heads 208, 210, and 212. Though three protocol heads are illustrated corresponding to runtime gateway 204 and one protocol head 206 corresponds to management gateway 202, a gateway may have more or less associated protocol heads. A gateway may have an architecture that includes protocol heads, has protocol heads that plug into a gateway, or use protocol heads that are associated in another manner.

In one embodiment, each protocol head implements a corresponding framing protocol. A framing protocol is a protocol that employs a socket to implement a connection with a client device. Examples of framing protocols include HyperText Transport Protocol (HTTP), .NET Message Framing Protocol (NMF), Session Initiation Protocol (SIP), Extensible Messaging and Presence Protocol (XMPP), and Advanced Message Queuing protocol (AMQP), In some implementations, a protocol head may listen for messages on one or more ports associated with the protocol. Various configurations may include additional protocols or exclude one or more of these protocols.

Each protocol head may process incoming messages to provide a canonical form of messages and data to downstream components. Similarly, it may receive messages and data from internal components and process them to generate messages conforming to its corresponding protocol and to maintain communication sessions with tenants. Thus, in one embodiment, protocol heads may enable components such as pipeline 218, subsystem adapter 224, or subsystem backend 230 to receive messages and data without having to process the various external framing protocols.

In one embodiment, each protocol head may, in response to receiving an incoming message, retrieve corresponding data and attach the corresponding data to a canonical form of message. In one embodiment, in response to receiving a request that specifies a resource, a protocol head retrieves a corresponding resource handle and a resource description from policy store 214, attaches these to the received message, and forwards it in a canonical form independent of the external protocol. This process is described in further detail herein.

In some implementations a protocol head may be configured to defer reading or canonicalization of an incoming message, or portions thereof. For example, a protocol head may provide a decoder component to a downstream component, the decoder component having logic to read a message and extract data. In one implementation, a decoder component may be attached to the message itself. In some implementations, a decoder component may be provided by another message or another mechanism. In these implementations, a message may be considered to be a "lazily" constructed canonical message.

Though not illustrated, protocol heads 206-212 may have an associated "push" adapter or a "pull" adapter component that processes push protocols or pull protocols, respectively. A push adapter may have a queue that enables subsystems to submit push tasks, sends messages to external entities, retrieves responses and forwards the responses back to the subsystem. A pull adapter may solicit messages from external entities on a schedule and forward the messages to the appropriate subsystem via the runtime gateway.

In various configurations, management gateway protocol head 206 may be configured to handle the same protocol as one of runtime gateway protocol heads 208-212, or it may handle a different protocol than the runtime gateway protocol heads.

In one embodiment, management gateway 202 may include mechanisms to facilitate management of resources by each subsystem. Management may include creation or allocation of resources, deletion or deallocation of resources, changing or reconfiguring resources, monitoring of resources, or other management tasks. In one embodiment, management gateway processes and forwards tenant requests to the management adapter 226 associated with the subsystem that corresponds to the requested resource. In one implementation, configuration table 232 may include data that maps each resource type to a corresponding subsystem. In response to receiving a request for a resource, management gateway 202 may look up the identification of the corresponding subsystem, and forward the request to the management adapter 226 of the specified subsystem. Management adapter 226 may further process requests and forward them to one or more backend components of the subsystem for management processing.

In the illustrated configuration, management gateway 202 and runtime gateway 204 employ policy store 214, which serves as a database of settings and configurations. More specifically, in one implementation, in response to receiving a resource request, management gateway 202 stores, in policy store 214, a description of the requested resource and its characteristics. For example, this may include the maximum size of a queue or storage resource, expiration times, resource behaviors, or other characteristics. An example of a behavior is a policy of what action to take if a resource overflows or encounters error conditions. The set of desired resource characteristics is referred to as the "oughtness" of the resource.

In one embodiment, management gateway 202 may receive, from management adapter 226 or subsystem backend, a description of the actual resource allocated in response to a request. This description may differ from the requested oughtness. For example, the allocated resource may have a smaller size than that requested. The description of the actual resource is referred to as the "isness" of the resource. Management gateway 202 may store the isness of a resource in policy store 214. In one implementation, management adapter 226 may return a handle corresponding to an allocated resource. The handle may be used to identify the resource. In one implementation, management gateway 202 may receive the resource handle and the isness of the resource and store them in policy store 214.

The resource description may include a URI that corresponds to, and identifies the resource. The URI may be sent to the requester in a response to the request. The URI may be a projection into a namespace that is specified by a tenant and used by runtime gateway 204 to identify the resource in a subsequent tenant request. In one implementation, the URI is in the form of a DNS name in which a prefix corresponds to a specified namespace and a suffix identifies the resource. In one embodiment, identification of the runtime or management gateways may be specified by a substring in a URI. For example, the URI prefix "http://foo-tenant" may specify a namespace of "foo" and a request destination of the runtime gateway. A corresponding URI prefix "http://foo-mgmt" may specify the same namespace of "foo" and a request destination of the management gateway. Thus, the runtime URI and the management URI may refer to a common namespace, as identified by a symbolic name, such as the example of "foo." In one embodiment, the management URI and the runtime URI are not distinguished by different prefixes, as they are in these examples.

In one embodiment, identification of resources corresponding to the gateway forms a tree structure, in which each subsystem or resource type in a designated namespace has a corresponding node, and each resource associated with each subsystem has a corresponding node that is a descendant of the subsystem or resource type node. An example of such a URI is http://foo-tenant.windows.net/resources/queues/a/b. In this URI, "foo" identifies the namespace, "queues" identifies a resource type, and "a/b" identifies a specific queue resource in the namespace. In one implementation, each such URI may have a corresponding management URI that identifies the same resource and directs the message flow to management gateway 202. For example, the URI http://foo-tenant-mgmt.windows.net/tresources/queues/a/b corresponds to the example queue resource, and may be used by a tenant to perform management tasks related to the resource. Management gateway 202 may send a runtime URI and a management URI to a tenant, enabling the tenant to manage a resource with the former and perform runtime operations with the latter. A second tenant may use a namespace "bar," such that the URI http://bar-tenant.windows.net/resources/queues/a/b corresponds to a resource owned by the second tenant and differs from a queue resource owned by the first tenant using the "foo" namespace.

In one embodiment, runtime gateway 204 functions as a gateway to each subsystem, and communicates with runtime adapter 228 of subsystem adapter 224. In one embodiment, runtime gateway 204 includes one or more pipeline components in a processing pipeline, each component processing incoming requests prior to forwarding them. For example, pre-authorization pipeline component 220 may perform a preliminary authorization of a request and conditionally forward the request based on the authorization result. Further details of the pre-authorization pipeline component 220 are provided herein. One or more filter pipeline components 222 may perform actions to conditionally forward incoming requests based on configured criteria. Various configurations may exclude pre-authorization component 220 or filter component 222, or include one or more other pipeline components. Each pipeline component may be selectively used to process a message, based on a system configuration, resource data associated with a request, or other factors.

Pipeline components act as intermediaries between a tenant and a subsystem. In some embodiments, pipeline components may extract data or alter message headers, but do not alter the payload of an incoming request, though some embodiments may allow for payload alterations. One or more pipeline components may be implemented as plug-ins to the gateway.

In one embodiment, runtime gateway 204 may receive a request that includes a runtime URI corresponding to the resource that is the target of the request. The URI, or a portion thereof, may be used to look up and locate the description data corresponding to the resource in policy store 214. The description data may include data that specifies which pipeline components are to process the request, how the request is to be processed, or other parameters of pipeline processing. For example, the description data may have settings that indicate the type of pre-authorization that is to be performed, criteria for determining authorization to access the resource, or other settings.

Runtime gateway 204 may determine a subsystem corresponding to the request based on the received URI. In one embodiment, the URI or the resource description data indicates the resource type. Configuration table 232 may include a mapping of resource type to subsystem. After performing appropriate pipeline actions, runtime gateway 204 may forward the request to the corresponding subsystem. Specifically, in one embodiment, runtime gateway 204 may forward the request to the runtime adapter 228 of the appropriate subsystem. In one embodiment, runtime gateway retrieves from policy store 214 a resource handle corresponding to the resource specified in the received URI, and corresponding description data. Runtime gateway 204 may attach the resource handle or description data to the forwarded message, or otherwise pass the resource handle or description data to a subsystem.

In one embodiment, the gateway may wrap a message that is sent to the subsystem. Wrapping may include placing the message in the body of a surrounding message for transport. In one implementation, the original message header may be wrapped together with the message payload. In one implementation the original message header may be excluded from the wrapped message.

The message may be received by runtime adapter 228. In response to receiving a runtime request, runtime adapter 228 may initiate actions or operations on the designated resource. Initiation of actions or operations may include sending one or more commands to one or more components of the associated subsystem backend 230. In one embodiment, subsystem adapter 224 and subsystem backend 230 are components of a subsystem, such as subsystem 114, 116, or 118, and each subsystem may have a similar architecture. For each subsystem, subsystem backend 230 may be collocated with subsystem adapter 224, or remotely located. In one implementation, subsystem adapter 224 may behave as a proxy for subsystem backend 230. It may wrap an incoming request and send a message containing the request to one or more subsystem backend components, receive a response, and subsequently respond to the requester. Subsystem backend components may therefore be unaware of tenant identities or locations, incoming request protocols, or other such data.

Figure 3:
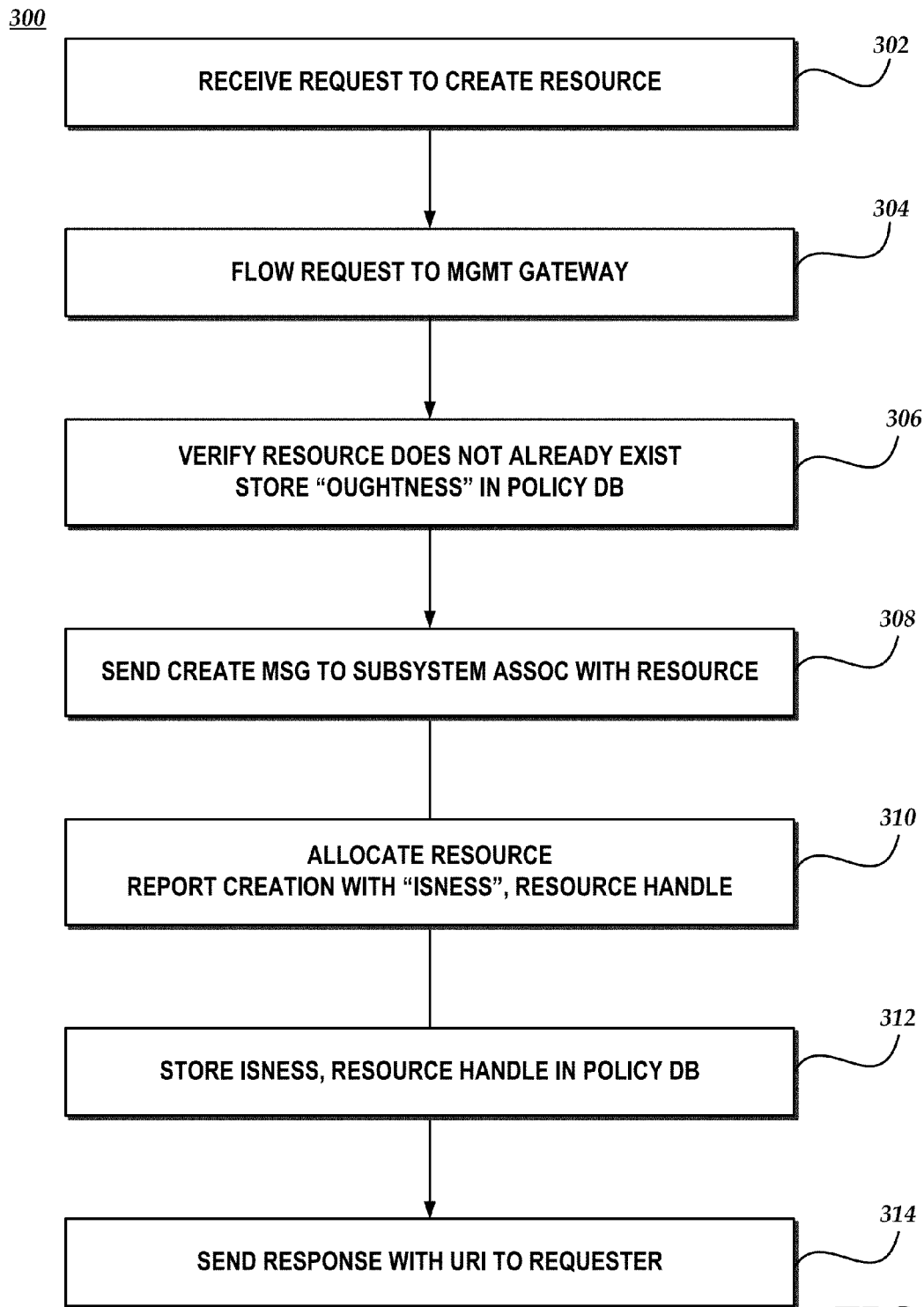
FIG. 3 is a flow diagram illustrating an example embodiment of a process for providing access to management services, in accordance with mechanisms described herein.

FIG. 3 is a flow diagram illustrating an example embodiment of a process 300 for managing a resource, specifically allocating a resource, in accordance with some of the mechanisms described herein. Process 300, or a portion thereof, may be performed by various embodiments of system 200 or a variation thereof. Components of system 200 are used as examples of an implementation herein, though in various embodiments, the correspondence of process actions and components may vary. The illustrated portions of process 300 may be initiated at block 302, where a request to allocate a resource is received. In one configuration, the request is received from a tenant, such as tenant 101, 103, or 105 of FIG. 1. The request may be received by management gateway 202, or another component that receives and forwards requests. The request may specify a type of resource that is to be created, including various specifications of the resource. Specifications may include, for example, a size limit, duration of time, or other characteristics of the resource.

The process may flow to block 304, where the request, if not received by management gateway 202, is forwarded to management gateway 202. The process may flow to block 306, where a determination is made of whether the resource already exists. If the resource does not already exist, the management gateway 202 may store the oughtness of the desired resource in a database, such as policy store 214. Though not illustrated in FIG. 3, for management requests regarding an already existing resource, a process may abort if the resource is not found to exist.

The process may flow to block 308, where management gateway 202 sends an allocate message to a subsystem associated with the resource type. As discussed herein, in one embodiment these actions include determining, based on a configuration table, the appropriate subsystem.

The process may flow to block 310, where the subsystem receiving the allocate message allocates a resource of the desired type. In some configurations, the actual characteristics of the allocated resource may differ from the oughtness previously stored. If successful, the subsystem may report back to the management gateway 202 the isness of the resource, a resource handle, or other identifying information. It is to be noted that allocating a resource may be performed in a variety of ways, depending on the resource type, the implementations used, or the system configuration. In some situations, the resource may already exist and allocation may include reserving its use. In some situations, allocation may include creating the resource or a portion thereof. In some situations, a resource may be shared and allocation may be performed by increasing a use count or otherwise designating an association with the resource. As used herein, allocating a resource may thus include a variety of actions.

The process may flow to block 312, where the management gateway 202 may store the isness and the resource handle in the policy database. The process may flow to block 314, where a response is sent to the requester. The response may include a status. If the status is success, the response may include a URI that can be subsequently used to manage the resource. In one embodiment, the response includes a runtime URI that can be subsequently used to perform runtime operations with the resource.

The process may flow to other actions, not shown, exit, or return to a calling program.

Figure 4:
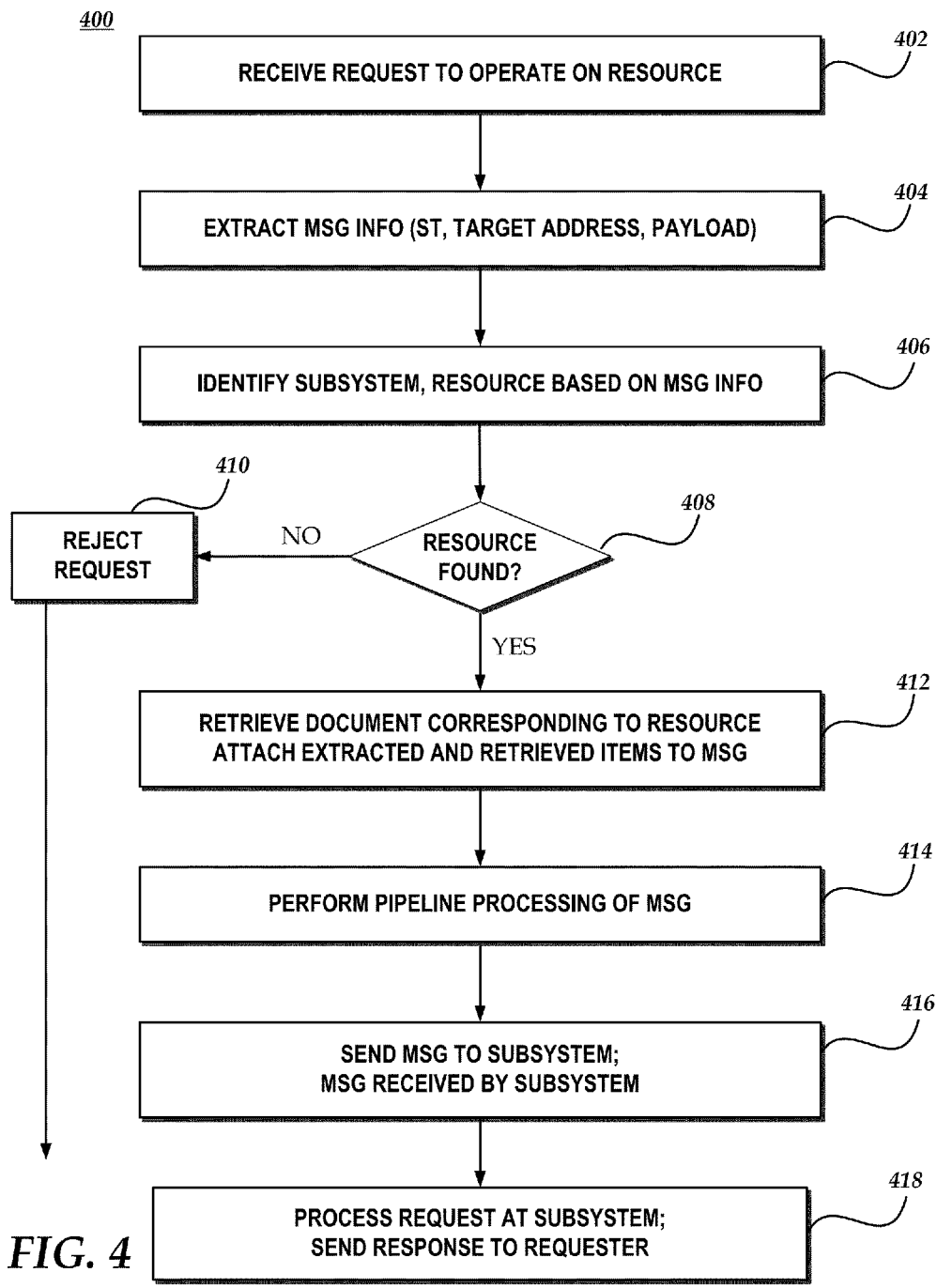
FIG. 4 is a flow diagram illustrating an example embodiment of a process for providing access to runtime operations, in accordance with mechanisms described herein.

FIG. 4 is a flow diagram illustrating an example embodiment of a process 400 for providing access to runtime operations related to a resource, in accordance with some of the mechanisms described herein. Process 400, or a portion thereof, may be performed by various embodiments of system 200 or a variation thereof. Components of system 200 are used as examples of an implementation herein, though in various embodiments, the correspondence of process actions and components may vary or process 400 may be performed with a variation of system 200. The illustrated portions of process 400 may be initiated at block 402, where a request to perform a runtime operation on a resource is received. In one configuration, the request is received from a tenant, such as tenant 101, 103, or 105 of FIG. 1. The request may be received by runtime gateway 204, or another component that receives and forwards requests. Examples of operations that may be requested are storing or retrieving a data item, adding an item to a queue, sending a message, processing data, or other operations. In one embodiment, the request may be in the form of one or more messages and may be received by a protocol head, such as protocol head 208, 210, or 212.

The process may flow to block 404, where information may be extracted from the request message. This information may include one or more of a target address, a security token, a specification of a resource, a message payload, or other header data.

The process may flow to block 406, where a subsystem and resource may be identified based on the extracted message information. In one embodiment, this may include looking up a resource based on at least a portion of the target address, which may be in the form of a URI. As discussed herein, a URI may include a string that indicates a subsystem, a resource type, or a resource. The URI, or portion thereof, may be used as a key to look up a resource in policy store 214.

In one embodiment, lookup of a resource may include determining a longest prefix match based on a string from a URI. For example, a URI may include the string "AA/BB/

CC". The policy store may include a match for the string "AA/BB", and no match for "AA/BB/CC". It may thus be determined that the resource corresponding to "AA/BB" is the matching resource. This technique provides a way for a subsystem that provides a URI corresponding to the resource to include a suffix for its private use. For example, the substring "CC" in the above example may represent information passed back by the subsystem upon resource creation, wherein this information is used by the subsystem in subsequent requests. The gateway may omit any configuration that uses or even understands the private information, and each subsystem may have its own system for use of the private suffix information.

The process may flow to decision block 408, where a conditional flow is determined based on the lookup of the resource. If, at block 408, a matching resource is not found, the process may flow to block 410, where the request is rejected. Rejecting a request may include sending a status response back to the requesting tenant, dropping the request, or another action. A status response may be based on the communications protocol employed with the tenant. For example, if the HTTP protocol is used, a 404 not found error may be returned. If the NMF protocol is used, a not-found fault may be sent. The process may exit or return to a calling program.

If, at decision block 408, a matching resource is found, the process may flow to block 412, where a resource data may be retrieved. The resource data may be in the form of a document, structured data, or other format or combination thereof. In one embodiment, the resource data includes a handle to the resource, data indicating whether requests related to the resource are to be checked for authorization by the runtime gateway, parameters to the authorization determination, specifications of pipeline processing that is to be performed, maximum resource size, quotas, or other data descriptive of or associated with the resource. In one implementation, the resource data may include a set of name-value pairs that indicate a contract between the runtime gateway and the subsystem corresponding to the resource. Example instructions of such a contract may include:

authorization=TRUE;
    size limit=64K;

The actions of block 412 may include attaching the extracted data and the resource data, or portions thereof, to the request message. This enables the data to be available to downstream processes, and particularly to the receiving subsystem, in a canonical form.

As used herein, "attaching" data to a message may be performed in any of a variety of ways. One technique is to prepend or append the data to the message. Other techniques may include replacing the original message header with a normalized header or associating links to the data with the message. Generally, attaching data includes associating the data with the message so that it may be easily retrieved by another process that receives the annotated message, including a remote process.

Figure 5:
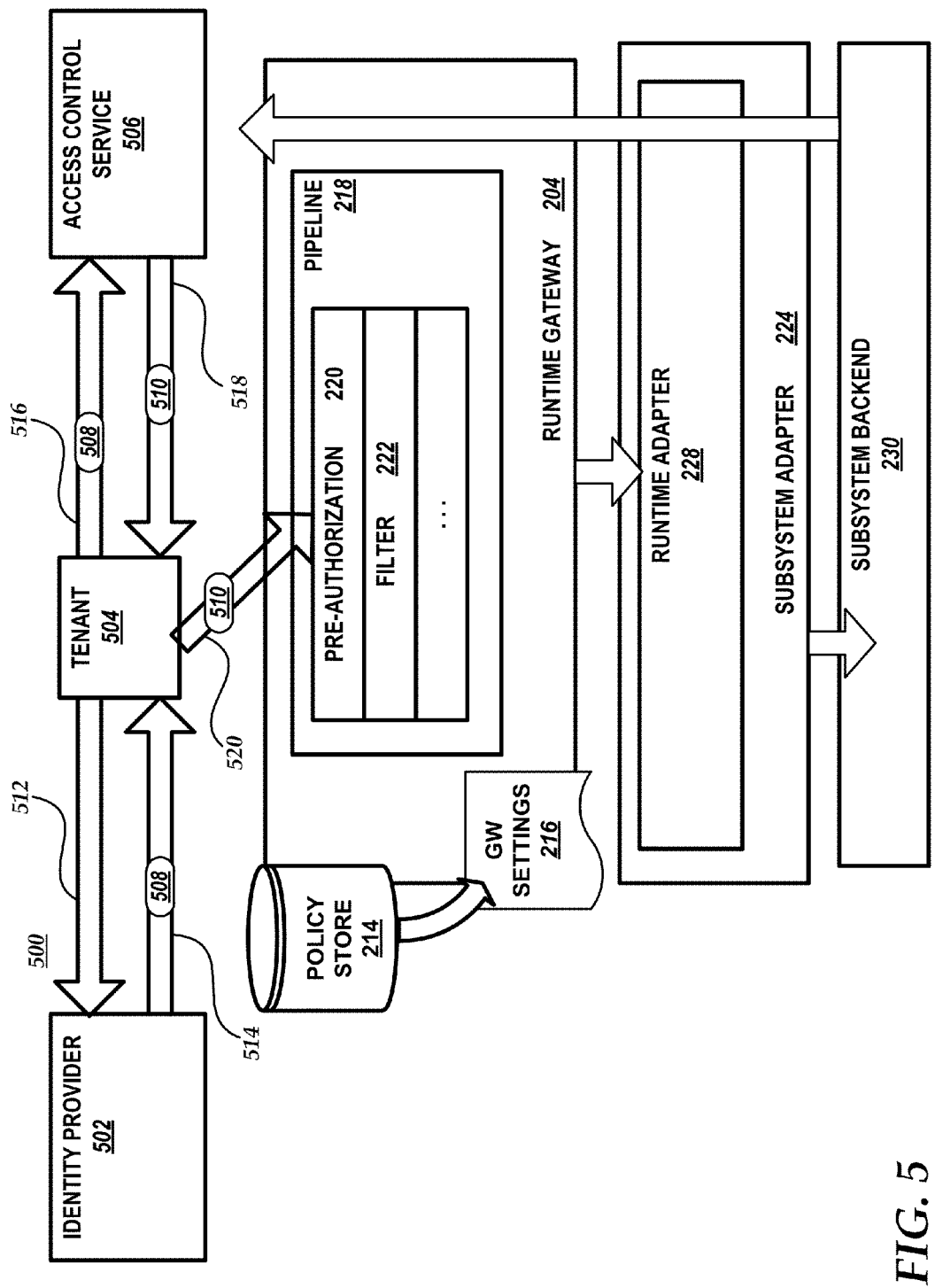
FIG. 5 is a block diagram of an example system for providing access to services, in which authorization mechanisms described herein may be deployed.
Figure 6:
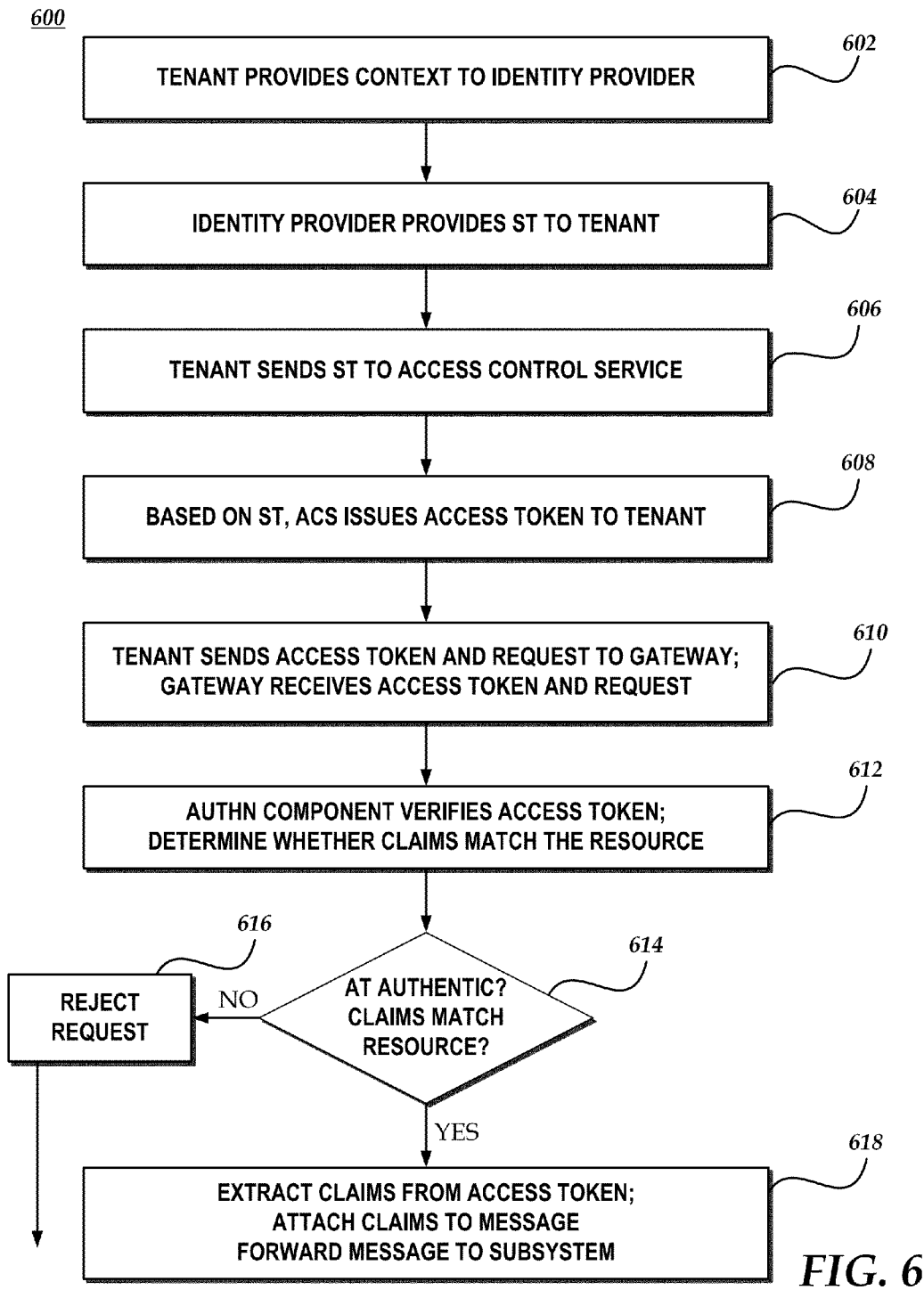
FIG. 6 is a flow diagram illustrating an example embodiment of a process for authorizing access to services, in accordance with mechanisms described herein.

The process may flow to block 414, where pipeline processing of the request message may be performed. As discussed herein, the pipeline components that process a request message may be based on a system configuration or specifications of the resource data. FIGS. 5 and 6, and associated discussion illustrate an example of pipeline processing that may be performed. Though not illustrated in FIG. 4, pipeline processing may result in the request being rejected, discarded, or modified.

The process may flow to block 416, where the message may be sent to a subsystem corresponding to the resource. As discussed herein, sending the message may include wrapping the message in another message, and sending the outer message to a remotely located subsystem. At block 416, the message may be received by the target subsystem. In some configurations, the subsystem, or a portion thereof, may be remotely located. In one embodiment, the runtime adapter 228 may maintain information for use in locating the subsystem backend 230.

The process may flow to block 418, where the subsystem may process the request. The subsystem may use at least some of the resource data attached to the message to process the request. The actions of block 418 may include sending a response to the requesting tenant. A response may include a status, requested data, or other information. Though not illustrated in FIG. 4, in one embodiment, a response sent from the subsystem may be received and forwarded by runtime gateway 204. This may include processing by a protocol head. The protocol head may create an external message to send to the requesting tenant, employing the protocol in which the request message was received at block 402.

The process may exit or return to a calling program.

FIG. 5 is a block diagram of a gateway system 500 that performs authorization of a tenant. System 500 includes at least some of the components of gateway system 200. Like numbered components are to be considered equivalent components, and discussions herein of system 200 apply to some embodiments of system 500. Some components of gateway system 200 are omitted from gateway system 500 for simplicity, though in one embodiment, gateway system 200 and gateway system 500 may be different views of the same gateway system.

In the illustrated configuration, gateway system 500 includes runtime gateway 204, subsystem adapter 224, subsystem backend 230, and policy store 214, as well as subcomponents of each. Gateway system 500 further includes identity provider 502, tenant 504, and access control service (ACS) 506.

Identity provider 502 may be a local or remote network entity that issues security credentials to tenant 504. The credentials may represent claims about tenant 504 that can be trusted by ACS 506. In one embodiment, the security credentials include security token 508. Security token 508 may be sent to tenant 504 in response to identifying information, such as a name and password.

In one embodiment, tenant 504 sends security token 508 to ACS 506. ACS 506 may verify the authenticity of security token 508. If the verification is successful, ACS 506 may issue access token 510 to tenant 504. An access token is a security token that is trusted by runtime gateway 204.

Though not shown in FIG. 5, identity provider 502 may be one of a set of identity providers that are collectively referred to as an identity federation. ACS 506 trusts each identity provider in the federation and is able to authenticate security tokens from each provider. By acting as an intermediary. ACS 506 offloads from runtime gateway 204 the task of maintaining a trust relationship and authentication data with multiple identity providers in a federation that may change over time, or with protocols that may change.

An access token may contain a set of assertions or claims that are made by or granted to tenant 504. Tenant 504 may use the access token to request services at runtime gateway 204. In one embodiment, pre-authorization pipeline component 220 (referred to herein as "pre-authN" 220) may authenticate the access token and determine whether the claims are sufficient to authorize tenant 504 to perform the requested operation with the specified resource. This is described in further detail in FIG. 6 and the discussion herein.

FIG. 6 is a flow diagram illustrating an example embodiment of a process 600 for authorizing a tenant, in accordance with some of the mechanisms described herein. Process 600, or a portion thereof, may be performed by various embodiments of system 500 or a variation thereof. Components of system 500 are used as examples of an implementation herein, though in various embodiments, the correspondence of process actions and components may vary. The illustrated portions of process 600 may be initiated at block 602, where a tenant, such as tenant 504, provides identifying information to an identity provider, such as identity provider 502. This information may be sent in a message, as represented by arrow 512. The identifying information may include one or more of a user name, password, digital signature, biometric data, or other data that identifies or authenticates the identity of tenant 504. The identifying information is referred to as the context of tenant 504.

The process may flow to block 604, where, in response to receiving identifying information, the identity provider provides a security token to the tenant. Identity provider may perform various authentication processes and selectively provide the security token based on the authentication. In one implementation, security token 508 is sent in a message represented by arrow 514.

The process may flow to block 606, where the tenant sends the security token 508 to access control service 506. This may be sent in a request message represented by arrow 516.

The process may flow to block 608, where access control service 506 issues an access token based on the received security token. Though not illustrated in FIG. 6, access control service 506 may decline sending an access token if the security token is insufficient. For example, it may have been issued by an identity provider that is not trusted by the access control service. As represented by arrow 518, access control service 506 may send access token 510 in a message to tenant 504.

The process may flow to block 610, where tenant 504 may send a request and an access token in a message, represented by arrow 520, to runtime gateway 204, and the gateway receives the request and token. In one embodiment, the request and access token may be passed to pre-authorization pipeline component 220.

The process may flow to block 612, where pre-authorization component 220 performs actions to verify the access token and to determine whether the claims of the access token match the resource of the request. Verification of the token may include determining whether a digital signature is valid, whether the token has been issued by a trusted access control service, or other verification actions. In one embodiment, the access token may include one or more claims, such as the identity of the tenant, a subscription that the tenant owns or controls, or other rights of the tenant. In one embodiment, pre-authorization component 220, runtime gateway 204, a protocol header, or another component may retrieve gateway settings 216 from policy store 214. In one implementation, each resource has a corresponding data set, referred to as the gateway settings, that is stored in policy store 214. The gateway settings may indicate the type of pre-authorization that is to be performed, a list of tenants or groups that are allowed access to the resource, or one or more claims to be matched in order to allow access. For example, the gateway settings corresponding to a resource may specify a set of one or more candidate claims, such that an access token is authorized if it contains at least one of the candidate claims. Based on the gateway settings corresponding to the resource, the request, and the claims of the access token, pre-authorization component 220 may determine whether the claims match the resource and whether to authorize the request.

The process may flow to decision block 614, where a decision is made based on the determinations. If the access token is not authentic, or the claims do not correctly match the resource or the request, the process may flow to block 616, where the request is rejected. Rejecting a request may include sending a status response back to the requesting tenant, dropping the request, or another action. The process may exit or return to a calling program.

If, at decision block 614, it is determined that the access token is authentic and the claims match the resource or request, the process may authorize the request and flow to block 618, where at least a subset of the claims are extracted from the access token and attached to the request message. The message may be forwarded toward the appropriate subsystem. Based on the gateway configuration or the gateway settings, additional pipeline components may process the request on its way to the subsystem.

In some configurations, a protocol head 208, 210, or 212 may extract the claims and attach them to the message. By extracting the claims, the receiving subsystem is enabled to process the claims without being configured to understand the token format or protocol. In one embodiment, the subsystem may perform additional authorization actions on the request. By having a pre-authorization stage that is separate from the subsystem, the architecture of FIGS. 2 and 5 offloads some of the authorization from the subsystem. This may serve to offload some processing, particularly in a configuration in which authorization is an expensive process. It may also enhance the resiliency of each subsystem in the event of a security attack or heavy usage situation.

Process 600 may perform additional actions, not shown, exit, or return to a calling program.

System 500 and process 600 illustrate authorization and message processing mechanisms with a runtime gateway. In some embodiments these mechanisms, or a portion thereof, may be employed with a management gateway. Thus, management request processing may employ process 600, or a variation thereof.

FIG. 7 is a block diagram showing one embodiment of a computing device 700, illustrating selected components of a computing device that may be used to implement mechanisms described herein, including systems 200 or 500 and processes 300, 400, or 600. Computing device 700 may include many more components than those shown, or may include less than all of those illustrated. Computing device 700 may be a standalone computing device or part of an integrated system, such as a blade in a chassis with one or more blades. Though the components of computing device 700 are illustrated as discrete components, any one or more of them may be combined or integrated into an integrated circuit, such as an ASIC.

As illustrated, computing device 700 includes one or more processors 702, which perform actions to execute instructions of various computer programs. In one configuration, each processor 702 may include one or more central processing units, one or more processor cores, one or more ASICs, cache memory, or other hardware processing components and related program logic. As illustrated, computing device 700 includes an operating system 704. Operating system 704 may be a general purpose or special purpose operating system. The Windows® family of operating systems, by Microsoft Corporation, of Redmond, Wash., includes examples of operating systems that may execute on computing device 700.

In one embodiment, computing device 700 includes one or more graphics processing units (GPU) 716. A GPU is a processor that is configured to perform graphics operations, such as rendering a graphic image, or to perform stream processing.

Memory and storage 706 may include one or more of a variety of types of non-transitory computer storage media, including volatile or non-volatile memory, RAM, ROM, solid-state memory, disk drives, optical storage, or any other medium that can be used to store digital information.

Memory and storage 706 may store one or more components described herein or other components. In one embodiment, memory and storage 706 stores management gateway 202, runtime gateway 204, policy store 214, one or more subsystem adapters 224, and one or more subsystem backends 230. In various embodiments, one or more of these components may be omitted from memory and storage 706. In some embodiments, at least a portion of one or more components may be implemented in a hardware component, such as an ASIC. In various configurations, multiple components implementing the functions or including the data of these components may be distributed among multiple computing devices. Communication among various distributed components may be performed over a variety of wired or wireless communications mechanisms.

Any one or more of the components illustrated as stored in memory and storage 706 may be moved to different locations in RAM, non-volatile memory, or between RAM and non-volatile memory by operating system 704 or other components. In some configurations, these components may be distributed among one or more computing devices, including computing devices that are remotely located from each other.

Computing device 700 may include a video display adapter 712 that facilitates display of data, scene frames, or other information to a user. Though not illustrated in FIG. 7, computing device 700 may include a basic input/output system (BIOS), and associated components. Computing device 700 may also include a network interface unit 710 for communicating with a network. Software components, such as those stored in memory and storage 706, may be received via transitory media and network interface unit 710. Computing device 700 may include one or more display monitors 714. Embodiments of computing device 700 may include one or more input devices (not shown), such as a keyboard, pointing device, touch screen, keypad, audio component, microphone, voice recognition component, or other input/output mechanisms.

It will be understood that each block of the flowchart illustrations of FIGS. 3-4 and 6, and combinations of blocks in each flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A computer-based method of providing a set of one or more services to one or more tenants, the method comprising:
    a) receiving a first request from a tenant to allocate a resource having a resource type, wherein the resource comprises at least one resource selected from a group consisting of data storage, computing processor time, queuing, messaging, and connectivity;
    b) in response to receiving the first request, determining, based on the resource type, a subsystem corresponding to the resource type;
    c) forwarding the first request to the determined subsystem;
    d) after forwarding the first request, receiving, from the determined subsystem, an identification of the resource;
    e) storing resource data descriptive of the resource, the resource data including the identification of the resource;
    f) receiving, from the tenant in a first protocol, a second request, the second request comprising a request to perform an operation related to the resource;
    g) retrieving the resource data and attaching the resource data to the second request;
    h) forwarding, in a second protocol, the second request to the determined subsystem.

2. The computer-based method of claim 1, further comprising retrieving the resource data based on a component identifier in a URI of the request to perform the operation.

3. The computer-based method of claim 1, further comprising providing a plurality of protocol components, each protocol component having a corresponding protocol and computer instructions for providing, to a downstream component, a decoder component, the decoder component having logic to extract data from a message in a corresponding protocol.

4. The computer-based method of claim 1, further comprising, based on the resource data, performing a preliminary authorization of the tenant prior to forwarding the second request to the determined subsystem, and performing additional authorization of the tenant at the determined subsystem.

5. The computer-based method of claim 1, further comprising:
    a) receiving a security token from the tenant, determining whether the security token is issued from one of a configured federation of identity providers, and selectively issuing an access token; and
    b) in response to receiving the request to perform the operation, selectively authorizing the operation based on the access token.

6. The computer-based method of claim 1, further comprising:
    a) providing, to the tenant, a first domain name for requesting one or more management operations related to the resource, the management operations including at least one of deleting the resource, deallocating the resource, modifying the resource, or monitoring the resource; and
    b) providing, to the tenant, a second domain name for requesting one or more runtime operations related to the resource, the runtime operations including at least one of storing a data item, adding an item to a queue, or sending a message;
    wherein the first domain name indicates that one or more management operations are requested and the second domain name indicates that one or more runtime operations are requested.

7. The computer-based method of claim 1, wherein the resource includes at least one of data storage, processor usage, a communications subsystem, or a queuing service.

8. A computer-readable storage medium memory comprising computer program instructions for providing a set of resources to a plurality of tenants, the program instructions executable by one or more processors to perform actions including:
   a) performing actions to facilitate management of each resource by a corresponding subsystem, wherein the resource comprises at least one resource selected from a group consisting of data storage, computing processor time, queuing, messaging, and connectivity;
   b) performing actions to facilitate runtime operations related to the resources, each operation performed by the corresponding subsystem;
   c) communicating with the plurality of tenants by using one or more tenant protocols;
   d) communicating with each subsystem using a subsystem protocol;
   e) sending, to each subsystem, requests to allocate resources and, in response, receiving an identification of each resource;
   f) storing resource data corresponding to each resource, the resource data including the identification of each resource received from the corresponding subsystem; and
   g) receiving requests to perform the runtime operations related to the resources;
   h) in response to receiving each request to perform the runtime operation, retrieving the resource data corresponding to the corresponding resource, selectively attaching at least a portion of the corresponding resource data to each request and sending each request to the corresponding subsystem.

9. The computer-readable storage memory of claim 8, the actions further including performing an authorization determination for each received request and selectively sending each received request to the corresponding subsystem based on the authorization determination.

10. The computer-readable storage memory of claim 8 the actions further including receiving a namespace identifier from each tenant, including each namespace identifier in a response to the tenant, and employing the namespace identifier in a subsequent request to identify a resource, wherein the namespace identifier received from each tenant corresponds to the tenant.

11. The computer-readable storage memory of claim 8, the actions further including, in response to receiving a request message from a tenant to perform a runtime operation, extracting request information from the request message in a framing protocol and forwarding the request information to a corresponding subsystem in a different protocol.

12. The computer-readable storage memory of claim 8, the resource data corresponding to each resource including a handle to the corresponding resource.

13. A computer-based system for providing a set of services to a set of tenants comprising:
   a) a management gateway comprising at least one processor and configured to perform actions including:
      i) receiving tenant management requests to allocate a computer resource; and
      ii) for each received tenant management request, determining a corresponding subsystem based on a resource type specified in the received management request, forwarding the request to the determined subsystem, storing resource data corresponding to the computer resource, and sending a response to a requester of the computer resource, the response including an identification of the computer resource and not including the computer resource;
   b) a runtime gateway comprising one or more processors and configured to perform actions related to a specified computer resource, including:
      i) receiving tenant runtime requests, each runtime request including an identification of a computer resource, the identification sent to the tenant in a prior response to a request to allocate the computer resource; and
      ii) in response to receiving a runtime tenant request, retrieving the resource data corresponding to the computer resource identifier, selectively performing processing actions based on the retrieved resource data, determining a subsystem based on a type of the resource data, and forwarding the runtime request to the determined subsystem; and
   c) a set of one or more protocol components, each protocol component configured to receive each tenant runtime request in a corresponding protocol, extract data from the tenant runtime request, and forward the tenant runtime request in another protocol.

14. The computer-based system of claim 13, further comprising a set of one or more pipeline components, the runtime actions further including, in response to receiving each tenant runtime request, each pipeline component selectively processing each tenant runtime request based on the retrieved resource data prior to forwarding the runtime request to the determined subsystem.

15. The computer-based system of claim 13, further comprising a pre-authorization component configured to authorize each tenant runtime request prior to forwarding the runtime request to the determined subsystem.

16. The computer-based system of claim 13, further comprising means for performing pre-authorization actions prior to forwarding the runtime request to the determined subsystem.

17. The computer-based system of claim 13, further comprising means for configuring communication with a plurality of subsystems and isolating each subsystem of the plurality of subsystems from protocols employed by each tenant.

18. The computer-based system of claim 13, further comprising a mechanism that enables a tenant to specify a namespace and employs one or more URIs to specify a resource within the specified namespace.

19. The computer-based system of claim 13, further comprising a mechanism that employs a URI with each runtime request, the URI including a specification of a tenant namespace, a resource identification, and a private substring that is private to the subsystem, wherein the private substring is returned from the subsystem in response to receiving the tenant management request.

20. The computer-based system of claim 13, each of the management gateway and the runtime gateway separately addressable by a corresponding domain name employed by each of the set of tenants.

* * * * *